(12) United States Patent
Vito

(10) Patent No.: US 6,510,764 B2
(45) Date of Patent: Jan. 28, 2003

(54) AUTOMATICALLY TIGHTENING PEDAL STRAP

(76) Inventor: John Vito, 519 School Rd., Clarks Summit, PA (US) 18411

( * ) Notice: Subject to any disclaimer, the term of this patent is extended or adjusted under 35 U.S.C. 154(b) by 23 days.

(21) Appl. No.: 09/883,599

(22) Filed: Jun. 18, 2001

(65) Prior Publication Data

US 2002/0189395 A1 Dec. 19, 2002

(51) Int. Cl.⁷ .................................................. G05G 1/14
(52) U.S. Cl. ........................................................ 74/594.6
(58) Field of Search .............................. 74/594.6, 561, 74/563

(56) References Cited

U.S. PATENT DOCUMENTS

| | | | |
|---|---|---|---|
| 613,957 A | * 11/1898 | Ashworth | 74/594.6 |
| 3,842,688 A | 10/1974 | Baginski | 74/594.6 |
| 4,815,333 A | 3/1989 | Sampson | 74/594.6 |
| 4,836,047 A | 6/1989 | Alcamo | 74/594.6 |
| 5,755,144 A | 5/1998 | Ueda | 74/594.6 |

* cited by examiner

Primary Examiner—David A. Bucci
Assistant Examiner—Bradley J. Van Pelt
(74) Attorney, Agent, or Firm—Kenneth P. Glynn

(57) ABSTRACT

The present invention is a automatically tightening pedal strap, which has a front member sized and shaped for placing a user's front of a foot in a shoe into the device. The front member has a top portion and a bottom portion. The bottom portion includes a strap tightening driver moving mechanism for moving connecting device forwardly wherein the strap tightening driver moving mechanism moves in response to insertion of one's foot in a shoe into the device. There is also connecting device connecting the strap tightening driver moving mechanism and a strap member in which, when the strap tightening driver moving mechanism is moved forward within the front member, the strap member automatically tightens by movement of the connecting device on the strap member in response to the forward movement of the strap tightening driver moving mechanism. The strap tightening driver moving mechanism may be a slider or an end string attachment.

19 Claims, 5 Drawing Sheets

AUTOMATICALLY TIGHTENING PEDAL STRAP

BACKGROUND OF THE INVENTION

1. Field of the Invention

The present invention relates to pedal straps, and, in particular, to automatically tightening pedal straps for bicycles. More specifically, the automatically tightening mechanism may be means which tightens the strap portion while moving one's foot forwardly on a front portion of the pedal strap device.

2. Information Disclosure Statement

There are many utility patents and design patents relating to pedal straps. The following is representative of the art:

U.S. Pat. No. 3,842,688 to Martin R. Baginski describes and illustrates a strap for use with a bicycle pedal to retain a rider's foot thereon. It comprises a first and a second elongated resilient strap portion, each of which are secured in the bicycle pedal. The first and second strap portions are moveable between a locked position and a released position. When the strap portions are in the locked positions, the cyclist's foot is retained on the pedal and any lateral movement of the first and second strap portions is prohibited. In the released position, the first and second strap portions are released from each other so that the cyclist's foot is no longer retained on the pedal thereby. The first strap portion has at least one aperture therein. The second strap portion has a protrusion which is positionable in one of the apertures in the first strap portion to prohibit relative lateral movement between the first and second strap portions created by the cyclist's foot during use of the pedal. The second strap portion also includes retainer means for retaining the first and second strap portions in the locked position and is releasable upon exertion of a force on one of the strap portions in a direction other than a lateral direction.

U.S. Pat. No. 4,815,333 to Eric A. Sampson discloses and bicycle pedal system which attaches a cyclist's shoe to a bicycle pedal. The system consists of a cleat attached to the cyclist's shoe under the ball area of the foot. The cleat has two downward projections. These projections feature arcuate tracts for matingly engaging the cleat to a pedal body. The pedal body is shaped to matingly engage the cleat and contains a tensioned mechanism centered in the back of the pedal body. If a rotating force on the cleat exceeds a predetermined level, a release of the shoe cleat from the pedal body occurs. If such rotating forces do not exceed the predetermined level, the shock or movement will be absorbed and the shoe cleat is returned to the optimum positions in the center of the pedal body.

U.S. Pat. No. 4,836,047 to John M. Alcamo discloses a bicycle pedal system comprising a shoe clip which attaches to a bicyclist's shoes. It has a pair of serrated lateral tongues which couple with and are easily inserted into complementary serrated recesses in the associated bicycle pedal. The construction and configuration of the system, including negative undercut serrations permits easy insertion of the clip into the pedal and permits easy lateral sliding of the clip along the pedal and lateral removal of the clip from the pedal when not in use, but securely lock the clip in the pedal against relative lateral movement during uses as well as against transverse separation.

U.S. Pat. No. 5,755,144 to Yutaka Ueda describes and illustrates a low profile bicycle pedal having a pedal body supported by a pedal shaft to be rotatable about an axis of the pedal shaft and at least a pair of clamping members attached to the pedal body for releasably coupling a cleat of a cyclist's shoe thereto. Preferably, at least one of the clamping members is pivotally coupled to the pedal body. The cleat has a substantially C-shape with a pair of attachment portions for coupling the cleat to the cyclist's shoe, and connection portion for interconnecting the attachment portions together. The attachment portions and the connecting portions form a pedal shaft receiving notch for accommodating the pedal shaft when coupled to the pedal body. Each clamping member has front and rear cleat engaging surfaces with the rear cleat engaging surface being spaced farther than the front cleat engaging surface from the center of the pedal body.

Notwithstanding the aforesaid prior art, the present invention device is neither taught nor rendered obvious thereby.

SUMMARY OF THE INVENTION

The present invention is a automatically tightening pedal strap, which has a front member sized and shaped for placing a user's front of a foot in a shoe into the device. The front member has a top portion and a bottom portion. The bottom portion includes a strap tightening driver moving means which moves connecting means to a forward portion of the front member The strap tightening driver moving means moves forwardly in response to insertion of one's foot in a shoe into the device.

There is also connecting means connecting the strap tightening driver moving means and a strap member. When the strap tightening driver moving means is moved forward within the front member, the strap member automatically tightens by either downwardly movement or upwardly movement of the connecting means on the strap member in response to the forward movement of the strap tightening driver moving means.

The strap tightening driver moving means may be a slider located within a track on the bottom portion, which is connected to the strap member. The connecting means may be connected to the slider through clamps, pins, ties and the like. In this embodiment, the connecting means is guided through a bottom of the device and in response to the movement of the strap tightening driver moving means pulls the strap downwardly to tighten it.

In another embodiment, the strap tightening driver moving means may be a slider, which is at least partially located on a top portion of said front member. It has a toe portion which moves in response to insertion of ones's foot in the device. In this case, the connecting means passes through a top of the device and pulls the strap upwardly, when it is tightened. The slider may be connected to a track in the bottom of the front portion or it may be connected to a top portion.

DESCRIPTION OF THE DRAWINGS

The present invention should be more fully understood when the specification herein is taken in conjunction with the drawings appended hereto wherein:

FIG. 1 shows a perspective view of a present invention automatically tightening pedal strap while

FIG. 3 shows a perspective view of an alternative embodiment of a present invention automatically tightening pedal strap while

FIG. 5 shows a perspective view of An alternative embodiment of a present invention automatically tightening pedal strap while

FIG. 7 shows a perspective view of an alternative embodiment of a present invention automatically tightening pedal strap while FIG. 9 shows a perspective view of an alternative embodiment of a present invention automatically tightening pedal strap while

DETAILED DESCRIPTION OF THE PRESENT INVENTION

The present invention is a automatically tightening pedal strap, which has a front member sized and shaped for placing a user's front of a foot in a shoe into the device. The front member has a top portion and a bottom portion. The bottom portion includes strap tightening driver means for moving connecting means to a forward portion of the front member, in which the strap tightening driver means moves forwardly in response to insertion of one's foot in a shoe into the device.

There is also a connecting means connecting the strap tightening driver means and a strap member. When the strap tightening driver means is moved forward within the front member, the strap member automatically tightens by either downwardly movement or upwardly movement of the connecting means on the strap member in response to the forward movement of the strap tightening driver moving means. Moreover, pulleys, ropes, gears, plates, rods, and the like may be driving means for the automatic strap tightening.

The strap tightening driver moving means may be a slider located within a track on the bottom portion, which is connected to the strap member. The connecting means may be connected to the slider through clamps, pins, ties and the like. The connecting means may be a nylon cord, woven or unwoven, or any other synthetic with little or no elasticity, such as a metal string. It could be various shapes such as circular, rectangular, polygonal, and the like.

Figure 1:
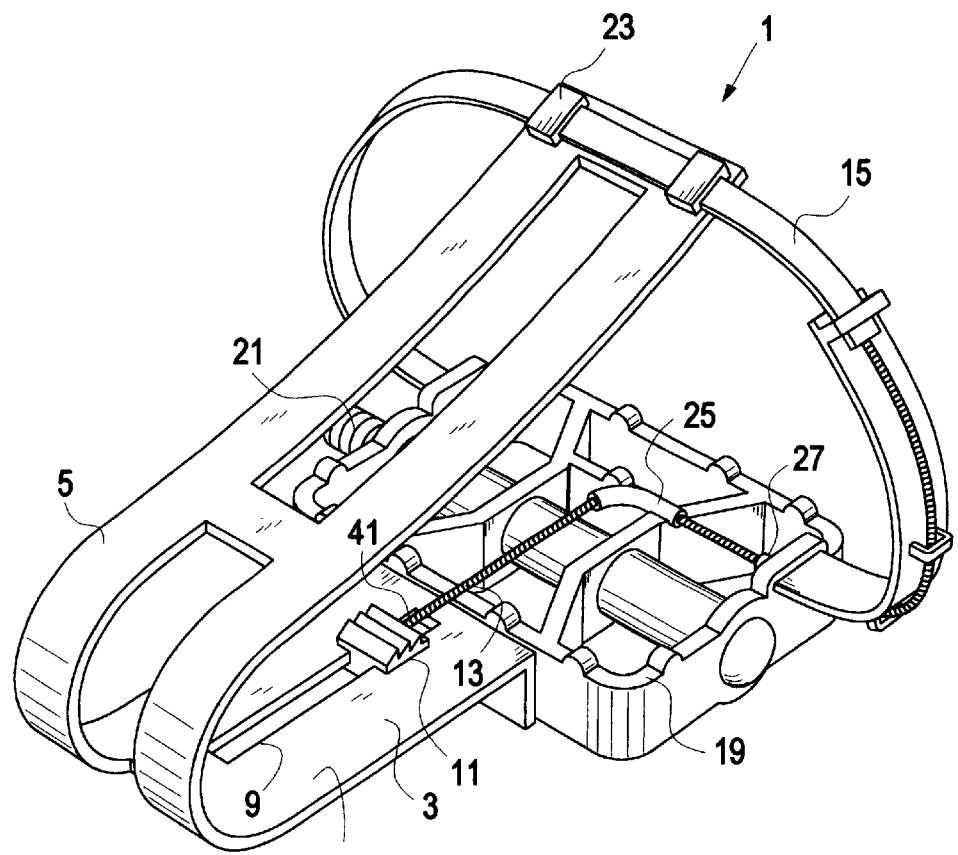
Figure 2:
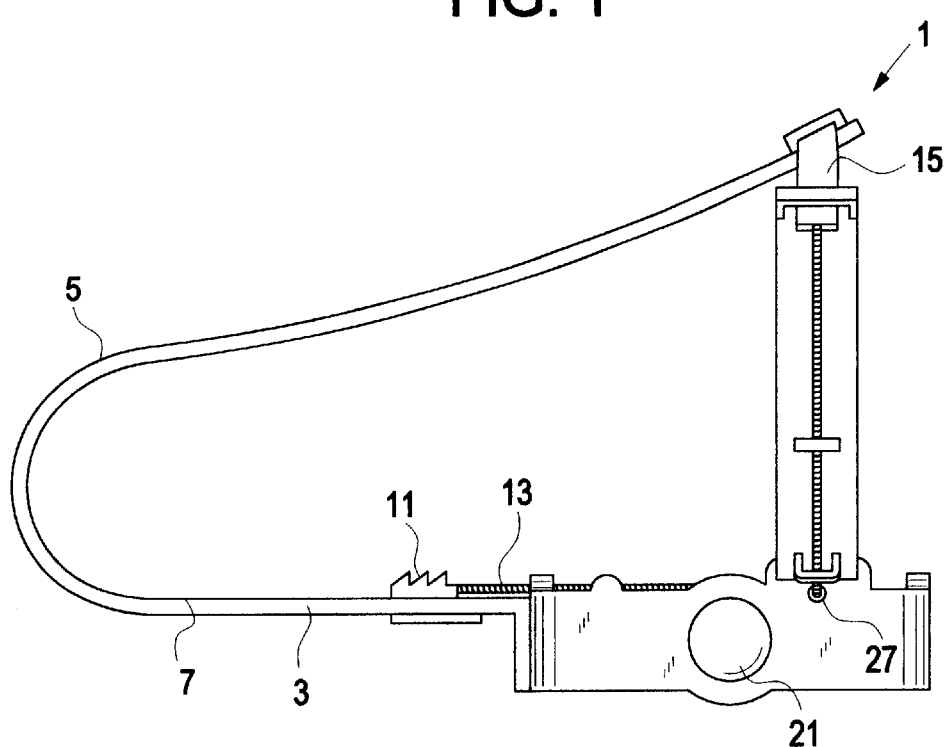
FIG. 2 shows a side view thereof.

Referring now to FIG. 1 and FIG. 2, there is shown a present invention automatically tightening pedal strap device 1. The device 1 includes a front member 3 sized and shaped for placing a user's front of a foot in a shoe into the device 1 and a back member 19 connected to the front member 3. The back member 19 includes pedal connecting means 21 for connecting a pedal portion to a rotating device.

The front member 3 has a top portion 5 and a bottom portion 7. The bottom portion 7 includes a forward moving means, in this case, a track 9, for moving a strap tightening driver moving means 11 and consequently connecting means 13 to a forward portion of the front member 3.

In this case, the strap tightening driver moving means 11 is a slider which slides within the track 9 in response to insertion of one's foot in a shoe into the device 1. The track 9 directs movement of the slider 11 and is sized and shaped to allow the slider 11 to slide.

There is also connecting means 13, in this case, a line of string, connecting the slider 11 and a strap member 15. The strap member 15 is connected to a rear portion of the back member 19 of the device 1. The connecting means 13 may be rope, string, cord, chain and the like. When the slider 11 is moved forward within the front member 3, the strap member 15 automatically tightens by downwardly movement of the connecting means 13 on the strap member 15 in response to the forward movement of the slider 11.

The automatic tightening of the pedal strap member 15 is accomplished by forward movement of the slider 11, which pulls the connecting means 13 and thus, ultimately tightens the strap member 15. The strap member 15 is automatically pulled down and tightened when the slider 11 is pushed forward on the track 9 and connecting means 13 moves downwardly on the strap member 15. The strap member 15 is further connected to the top portion 5 of the front member 3 through at least one aperture 23 in the top portion 5 of the front member 3.

The slider 11 includes a clamp 41 for holding the connecting means 13 in the slider 11. The holding means may also be a pin, ties or the like. The connecting means 13 is guided along the outer perimeter of the device 1 by guides 25 and 27 on the back member 19 of the device 1.

Figure 3:
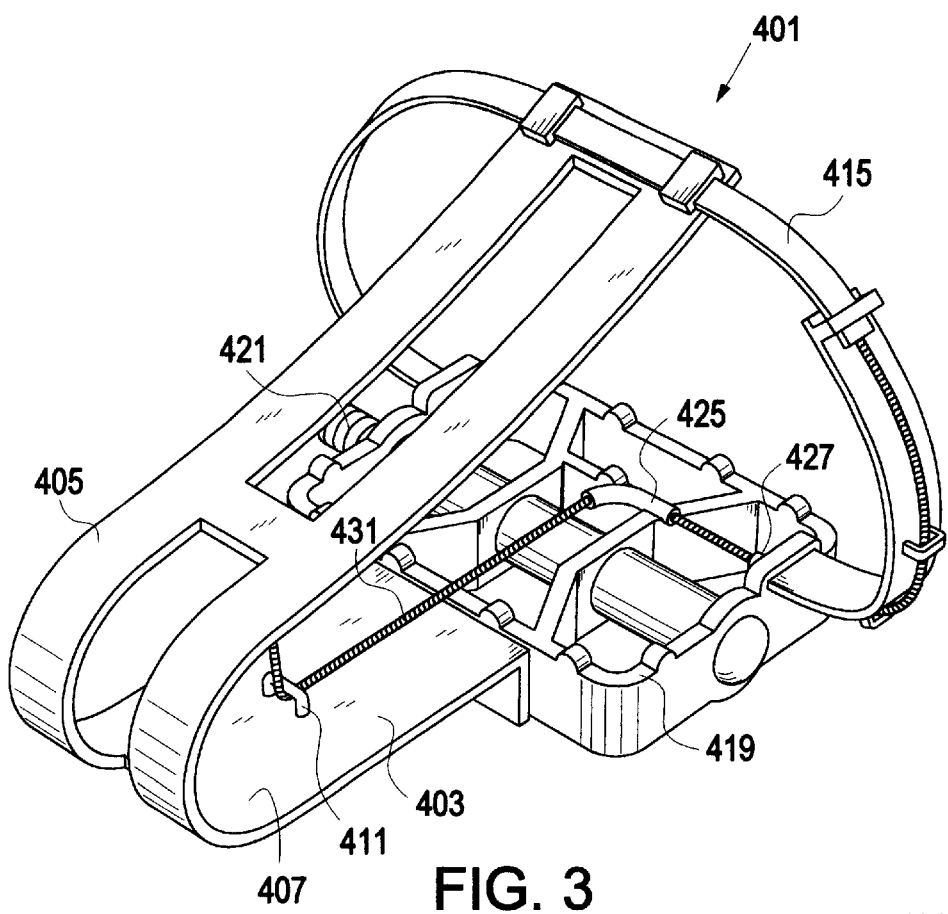
Figure 4:
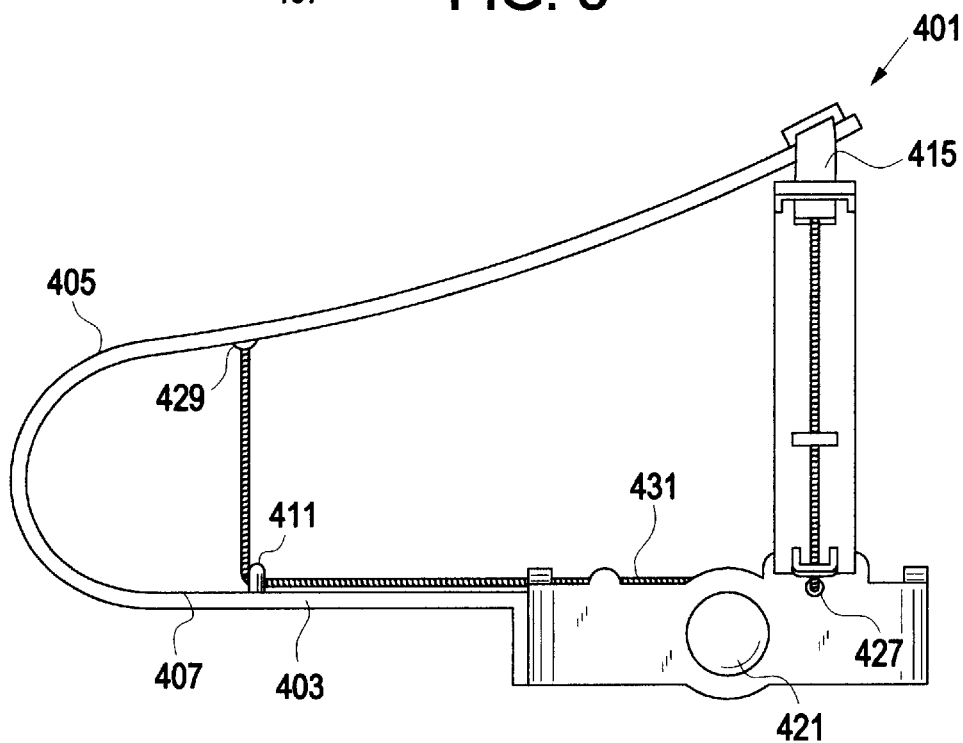
FIG. 4 shows a side view thereof.

Referring now to FIG. 3 and FIG. 4, there is shown an alternative embodiment of a present invention automatically tightening pedal strap device 401. In this embodiment, the connecting means 431 is connected to the top portion 405 of the front member 403 through a clamp 429. A back member 419 is connected to the front member 403 and includes pedal connecting means 421 for connecting a pedal portion to a rotating device.

The connecting means 431 is guided through clamps 411, 425, 427 to an outer perimeter of the device 401. When a user inserts one's foot in a shoe into the device 401, a connecting means 431 is pushed forward beyond the guide 411 to a front portion 407 of the front member 403. This movement causes the connecting means 431 to pull strap member 415 down and thus tighten the strap member 415. In this case, the strap tightening driver moving means is the guide 411, which causes connecting means 431 to move forwardly within the front portion 407 of the front member 403, in response to insertion of one's foot into the device 401.

Figure 5:
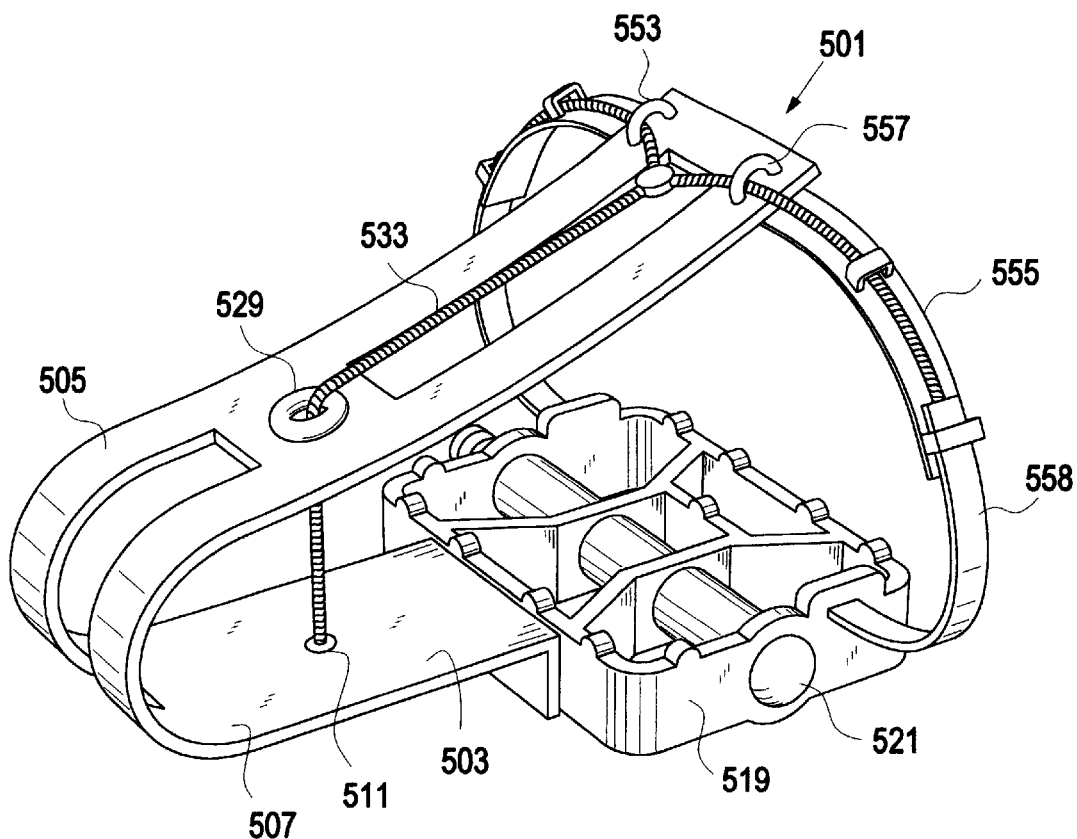
Figure 6:
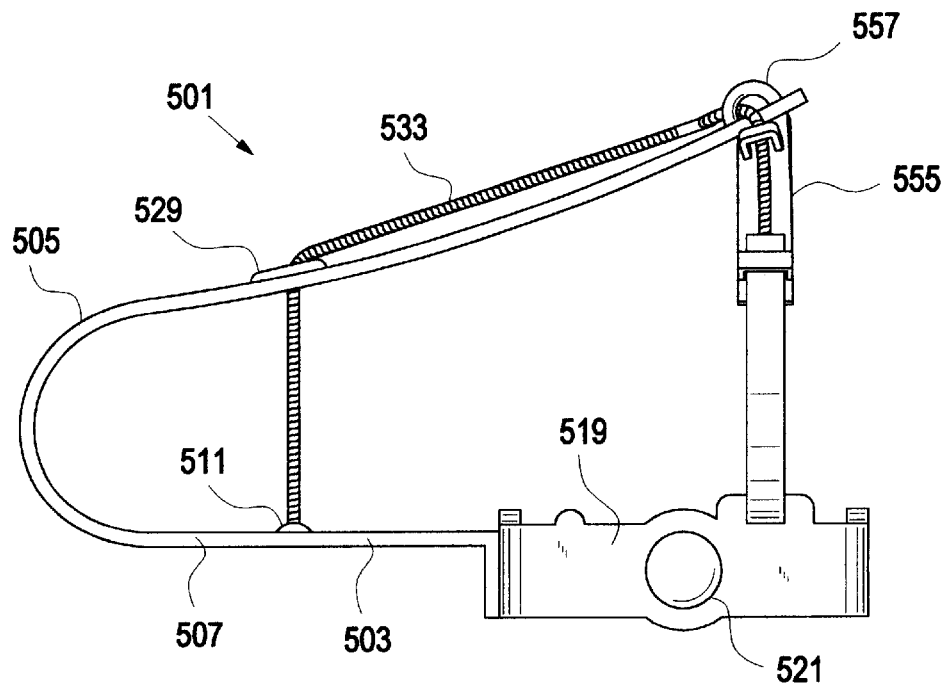
FIG. 6 shows a side view thereof.

Referring now to FIG. 5 and FIG. 6, there is shown an alternative embodiment of a present invention automatically tightening pedal strap device 501. In this embodiment, a connecting means 533 is connected to an end connecting means attachment 511 on one end and to a leaf spring 558 on a strap 855 on another end. Intermediate to the two ends are an eyelet 529 located on a top portion 505 of the front member 503, and guides 553, 557 located on the top portion 505. The connecting means 533 is thus guided through the eyelet 529 and the guides 553 557. The device also includes pedal connecting means 521 for connecting a pedal portion to a rotating device.

When a user inserts one's foot in a shoe into the device, the connecting means 533 moves forward within the front member 503 to a front portion 507. When this occurs, the connecting means is pulled upwardly through the guides 553 and 557 and consequently pulls the leaf spring 558 upwardly so the strap 555 is tightened. When a user removes one foot in a shoe from the device 501, the leaf spring 558 moves into a rest position and pulls the connecting means 533 backwardly into its rest position. In this case, the strap tightening driver moving means is the end connecting means attachment 511, which allows connecting means 533 to move forwardly within the front member 503.

Figure 7:
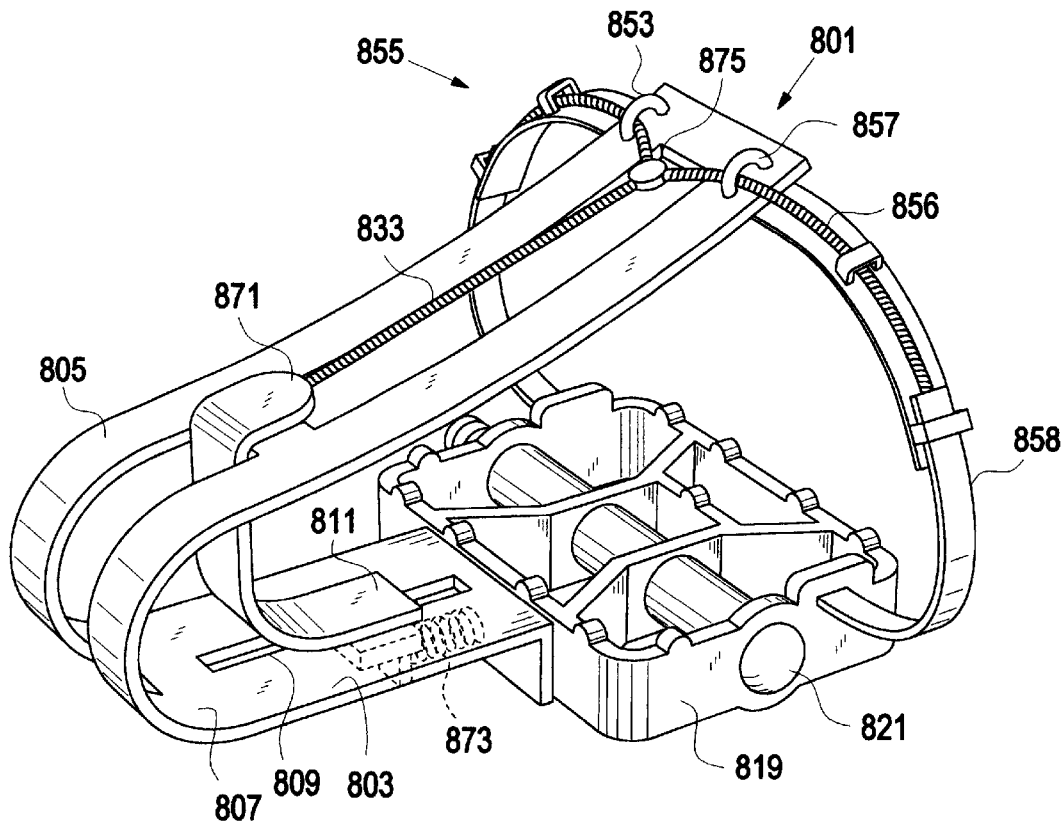
Figure 8:
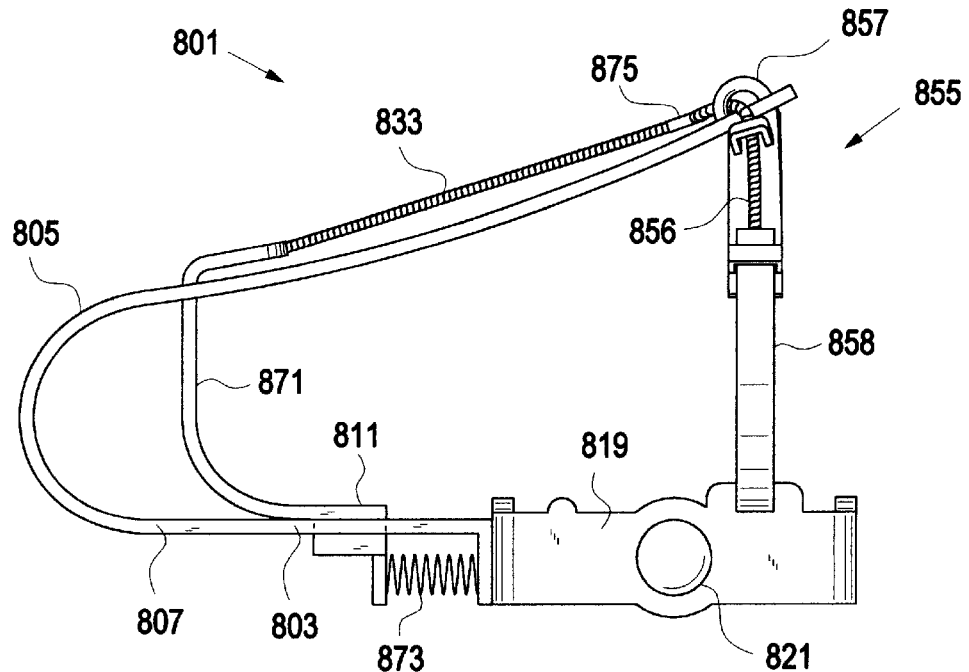
FIG. 8 shows a side view thereof.

Referring now to FIG. 7 and FIG. 8, there is shown a perspective view of another alternative embodiment of a present invention automatically tightening pedal strap 801 and a side view thereof, respectively. In this embodiment, there is shown a present invention device 801 having connecting means 833 connected to a slider 871 on one end and a leaf spring 858 on another end. The slider 871 is located within a track 809 on a front member 803 of the device and has a spring 873 attached to a lower portion 811. There are guides 853, 857 which guide movement of the connecting means 833. A junction knot 875 located on a top portion 805 of the front member 803 splits the connecting means 833 into two directions, each direction having single connecting means 856 attached to the leaf spring 858. The device also includes pedal connecting means 821 for connecting a pedal portion to a rotating device.

In operation, when a user places one's foot in a shoe into the device 801, a bottom portion 811 of the strap tightening driver moving means, in this case, slider 871 is pushed forward, together with the spring 873 moving forward. Consequently, the movement pulls the connecting means 833 and the connecting means junction knot 875 forward. When this occurs the single connection means 856 pulls the leaf spring 858 upward and thus tightens a pedal strap 855. The other side of the strap 855 is tightened, as well.

When a user removes one's foot, the spring 873 returns to a rest position and thus pulls the slider 871 backward within the track 809. In addition the leaf spring 858 returns to its rest positions and pulls the connecting means 833 backwardly.

Figure 9:
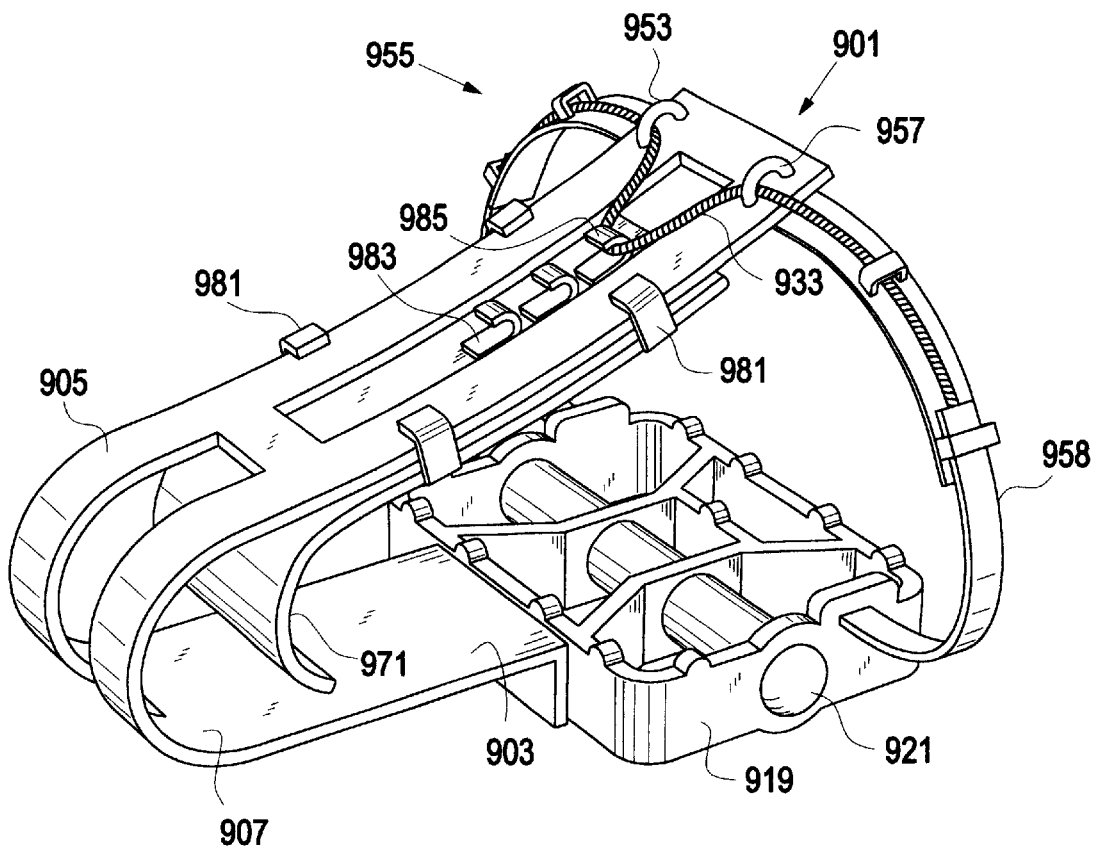
Figure 10:
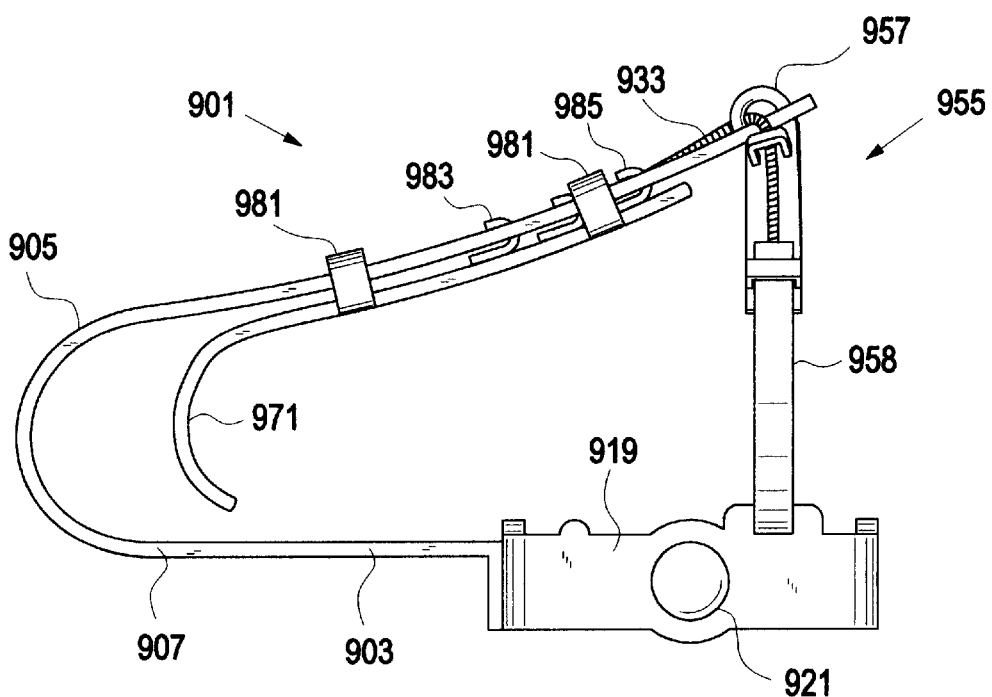
FIG. 10 shows a side view thereof.

Referring now to FIG. 9 and FIG. 10, there is shown still yet another alternative embodiment of present invention automatically tightening pedal strap device 901. The device 901 includes a front member 903 sized and shaped for placing a user's front of a foot in a shoe into the device 901 and a slider 981 attached to a top portion 905 of said front member 903. The front member 903 has a top portion 905 and a bottom portion 907. The slider 981 includes a toe portion 971 which is adapted to be pushed by one's foot in a shoe when a user foot is inserted into the device 901. In this case, the strap tightening driver moving means is the slider 981.

There is also a plurality of hooks 983, 985 for positioning connecting means 933 into different initial tightness of a strap 955. Guides 953 and 955 guide movement of the connecting means 933 from the strap 955. The connecting means 933 is attached to a leaf spring 958 on the strap 955 on one end and is attached to the slider 981 on the other end. A pedal connecting means 921 for connecting a pedal portion to a rotating device is located in a back portion of the device 901.

In operation, a user first positions the connecting means 933 into one of the plurality of hooks 983, 985 to the desired initial tightness. When the toe piece 971 is pushed forward within the front member 903 by a user's foot within a shoe, the strap member 955 automatically tightens by forward movement of the connecting means 933 within the device 901. Thus, the connecting means 933 pulls the leaf spring 958 upward and consequently tightens the strap 955. When a user removes one's foot from the device 901, the leaf spring 958 moves into a rest position and consequently pulls connecting means downward and backward within the device 901. Thus, the slider 981 is moved backward and the toe piece 971 is set up to be pushed by a user's foot for the next use of the device 901.

Obviously, numerous modifications and variations of the present invention are possible in light of the above teachings. For example, any driver means and driven means now invented, or to be invented, is envisioned within the scope of the present invention. Moreover, although not necessarily shown in the drawings, adjustment means could be included in all of the above embodiments to permit fitting for different size footwear to accommodate, for example, large adult's down to children's size footwear. This could be done with any normal size adjustment means, such as buckle, ratchet and locket, and would be well within the skill of the artisan. It is, therefore, understood that within the scope of the appended claims, the invention may be practiced otherwise than as specifically described herein.

What is claimed is:

1. An automatically tightening pedal strap device, which comprises:

(a) a front member sized and shaped for placing a user's front of a foot in a shoe into said device, said front member having a top portion and a bottom portion, said front member including a strap tightening driver moving means for moving connecting means forwardly wherein said strap tightening driver moving means moves in response to insertion of one's foot in a shoe into said device;

(b) a strap member connected to a rear portion of a back member of said device; and (c) said connecting means connecting said strap tightening driver moving means and said strap member wherein when said strap tightening driver moving means is moved forward within said front member, said strap member automatically tightens by movement of said connecting means on said strap member in response to said forward movement of said strap tightening driver moving means.

2. The automatically tightening pedal strap of claim 1 wherein said strap tightening driver moving means includes a slider located within a track on said front portion.

3. The automatically tightening pedal strap of claim 2 wherein said slider is connected through said connecting means to said strap member such that when said slider is moved forward said connecting means moves forward within said front portion and said connecting means pulls said strap member one of downwardly and upwardly whereby said strap member is automatically tightened.

4. The automatically tightening pedal strap of claim 3 wherein said connecting means is selected from the group consisting of rope, string, cord and chain.

5. The automatically tightening pedal strap of claim 4 wherein said strap member is further connected to said top portion of said front member.

6. The automatically tightening pedal strap of claim 5 wherein said connecting means is further connected to said back member through at least one guide.

7. The automatically tightening pedal strap of claim 6 wherein said slider includes a holding means for holding said connecting means in said slider.

8. The automatically tightening pedal strap of claim 7 wherein said holding means is selected from the group consisting of pin, clamp, and tie.

9. An automatically tightening pedal strap device, which comprises:

(a) a front member sized and shaped for placing a user's front of a foot in a shoe into said device, said front member having a top portion, a bottom portion, and moving strap tightening driver moving means for moving connecting means forwardly wherein said strap tightening driver moving means moves in response to insertion of one's foot in a shoe into said device;

(b) a strap member connected to a rear portion of a back member of said device wherein said strap member includes a spring;

(c) said back member including pedal connecting means for connecting a pedal to a rotating device; and (d) said connecting means connecting said strap tightening driver moving means and said strap member wherein when said strap tightening driver moving means is moved forward within said front member, said strap member automatically tightens by movement of said connecting means on said strap member in response to said forward movement of said strap tightening driver moving means.

10. The automatically tightening pedal strap of claim 9, wherein said strap tightening driver moving means includes a slider wherein said slider is connected to said top portion of said device and wherein said slider moves in response to insertion of a user's foot against a toe piece located on said slider.

11. The automatically tightening pedal strap of claim 10 wherein said slider is further connected to connecting means, said connecting means being connected to said strap member such that when said slider is moved forward said connecting means moves forward within said front portion wherein said connecting means pulls said strap upwardly whereby said strap is automatically tightened.

12. The automatically tightening pedal strap of claim 11 wherein said slider includes a plurality of hooks for initial tightening of said strap member.

13. The automatically tightening pedal strap of claim 12, wherein said connecting means is selected from the group consisting of rope, string, cord and chain.

14. The automatically tightening pedal strap of claim 11, wherein said strap tightening driver moving means includes a slider wherein said slider is connected to a track in said bottom portion of said device.

15. The automatically tightening pedal strap of claim 13, wherein a spring is attached to a bottom portion of said slider.

16. An automatically tightening pedal strap device, which comprises:
  (a) a front member sized and shaped for placing a user's front of a foot in a shoe into said device, said front member having a top portion, a bottom portion, and strap tightening driver moving means for moving connecting means forwardly wherein strap tightening driver moving means moves in response to insertion of one's foot in a shoe into said device;
  (b) a strap member connected to a rear portion of a back member of said device;
  (c) said back member including pedal connecting means for connecting a pedal to a rotating device; and
  (d) said connecting means connecting said strap tightening driver moving means and said strap member wherein when said strap tightening driver moving means is moved forward within said front member, said strap member automatically tightens by movement of said connecting means on said strap member in response to said forward movement of said strap tightening driver moving means.

17. The automatically tightening pedal strap of claim 15, wherein said strap tightening driver moving means includes an end connecting means attachment located on said bottom portion of said front member.

18. The automatically tightening pedal strap of claim 16, wherein said connecting means is further connected to one of said top member and said back member through a plurality of guides.

19. The automatically tightening pedal strap of claim 17, wherein said strap member includes a leaf spring.

* * * * *